United States Patent
Broberg

(10) Patent No.: US 9,727,579 B2
(45) Date of Patent: Aug. 8, 2017

(54) SYSTEMS AND METHODS FOR STORING DIGITAL CONTENT

(75) Inventor: James Andrew Broberg, Collingwood (AU)

(73) Assignee: MetaCDN Pty Ltd, Melbourne (AU)

( * ) Notice: Subject to any disclaimer, the term of this patent is extended or adjusted under 35 U.S.C. 154(b) by 405 days.

(21) Appl. No.: 13/807,279

(22) PCT Filed: Jul. 1, 2011

(86) PCT No.: PCT/AU2011/000832
§ 371 (c)(1),
(2), (4) Date: Feb. 7, 2013

(87) PCT Pub. No.: WO2012/000059
PCT Pub. Date: Jan. 5, 2012

(65) Prior Publication Data
US 2013/0138649 A1 May 30, 2013

(30) Foreign Application Priority Data

Jul. 2, 2010 (AU) .............................. 20100902944

(51) Int. Cl.
*G06F 17/30* (2006.01)
*G06F 7/00* (2006.01)
(52) U.S. Cl.
CPC .............................. *G06F 17/30215* (2013.01)
(58) Field of Classification Search
CPC .................................................. G06F 17/30215
USPC ................................... 707/736; 709/219, 226
See application file for complete search history.

(56) References Cited

U.S. PATENT DOCUMENTS

| 2010/0042720 | A1* | 2/2010 | Stienhans et al. ............ 709/226 |
| 2010/0332818 | A1* | 12/2010 | Prahlad ............... G06F 17/3002 713/150 |
| 2012/0246279 | A1* | 9/2012 | Zang et al. ................... 709/219 |

OTHER PUBLICATIONS

James Broberg, Rajkumar Buyya, Zhair Tani; MetaCDN: Harnessing 'Storage Clouds' for high performance content delivery, online publication of Apr. 5, 2009 http://www.sciencedirect.com/science/article/pii/S1084804509000514.*

* cited by examiner

*Primary Examiner* — James Trujillo
*Assistant Examiner* — John J Morris
(74) *Attorney, Agent, or Firm* — Perkins Coie LLP

(57) ABSTRACT

An overlay content distribution network provides a consistent interface to enable the storage and retrieval of digital content at multiple storage providers (210). An allocator component (140) instantiates and destroys location and/or provider specific agent processes (240) which transfer digital content to and from the storage providers (210). Encoding agent processes (250) are geographically located near the storage providers (210) at which the content is to be stored. Content may be stored in a manner which guarantees content availability, each storage provider (210) being periodically probed by a Quality of Service (QoS) probes distributed within the network.

24 Claims, 6 Drawing Sheets

SYSTEMS AND METHODS FOR STORING DIGITAL CONTENT

CROSS-REFERENCE TO RELATED APPLICATIONS

This application is a U.S. National Phase of International Patent Application No. PCT/AU2011/000832, filed Jul. 1, 2011, entitled SYSTEMS AND METHODS FOR STORING DIGITAL CONTENT, which claims priority to Australian Patent Application No. 20100902944, filed Jul. 2, 2010, each of which is incorporated herein in its entirety by reference thereto.

FIELD

The present invention relates to systems and methods for storing digital content at at least one remote storage location, for example for subsequent serving of that digital content to client devices from the at least one remote storage location.

BACKGROUND

The Internet has developed into an important medium for both communication and digital content distribution. Content distributed through the Internet (and more particularly, the World Wide Web) initially consisted primarily of digital commercial goods such as computer software and associated patches and upgrades. Increasingly both business and individual consumers are distributing a wide variety of digital content, such as movies, music, electronic books and amateur video footage.

Although content has conventionally been distributed using a client-server model (where a single server hosts digital content, and it is accessed by multiple clients), more recently protocols have been developed to enable the distribution of content amongst peers (one example of which is the BitTorrent protocol). Despite the increasing popularity of peer-to-peer content distribution systems, they have a number of drawbacks. For example, on networks created by such protocols it can be difficult to distinguish legitimate and authorised content from content that has been the subject of unauthorised modification (e.g., the injection of malware into legitimate software). Such distribution mechanisms also rely upon the content being available from a number of peers. This is typically only true for very popular content. Furthermore, it can be difficult for a content distributor to track how many people have accessed specific content, as the content distributor has very little control over the content after it has been released on a peer-to-peer network.

The client-server model of content distribution does not suffer from these drawbacks. However, as client-server based distribution involves the downloading of content from a single (or very small group) of content servers, those servers can come under heavy load and may be unable to meet all of the requests for content. It is this characteristic which also makes such servers vulnerable to denial-of-service attacks. Furthermore, if the client requesting the content is geographically distant from the server, the transmission of the content from the server to the client may be unacceptably slow.

To address these disadvantages, content delivery networks have developed. These networks enable content to be stored on multiple, geographically dispersed servers. The use of such content delivery networks shares the load between the geographically dispersed servers, and enables good response times and file transfer speeds to be achieved for requests originating from within a wide geographic area.

While conventional content delivery networks provide good load tolerance and quick download times, they involve very high infrastructure costs. These costs are passed on to users of the content delivery networks, with the result that many businesses and consumers cannot afford to make use of such content delivery networks.

With the increasing generation of multimedia digital content, such as audio and video content, and the increasing diversity of devices used to consume multimedia digital content (such as mobile telephones, personal digital assistants, laptop computers, desktop computers and televisions), it is desirable to store multiple versions of multimedia digital content and to ensure that an appropriate version is sent to a requesting client device. The transmission of multiple versions of multimedia digital content can involve high bandwidth use, and consequently high cost.

It is desired to address the shortcomings of the prior art, or at least provide a useful alternative.

SUMMARY

The present invention provides a computer-implemented system for storing digital content at at least one remote storage location maintained by a storage provider, the system including
- a gateway component to receive storage request data representing a request to store digital content, the storage request data including data identifying a source location of the digital content;
- an allocator component configured to:
    - determine from a plurality of remote storage locations the at least one remote storage location at which the digital content is to be stored, wherein the plurality of remote storage locations includes a first location accessible using a first message format and a second location accessible using a second different message format;
    - send, to at least one agent process associated with the at least one remote storage location, transfer request data representing a request to retrieve the digital content from the source location, and store it in the at least one storage location.

The present invention also provides a method for storing content at at least one storage location maintained by a storage provider, the method including the steps of:
- receiving storage request data representing a request to store digital content, the storage request data including data identifying a source location of the digital content;
- determining from a plurality of remote storage locations the at least one storage location at which the digital content is to be stored, wherein the plurality of remote storage locations includes a first location accessible using a first message format and a second location accessible using a second different message format; and
- sending, to at least one agent process associated with the at least one storage location, transfer request data representing a request to retrieve the digital content from the source location, and store it in the at least one storage location.

DRAWINGS

Preferred embodiments of the present invention are hereinafter described, by way of example only, with reference to the accompanying drawings, wherein.

DESCRIPTION

Figure 1:
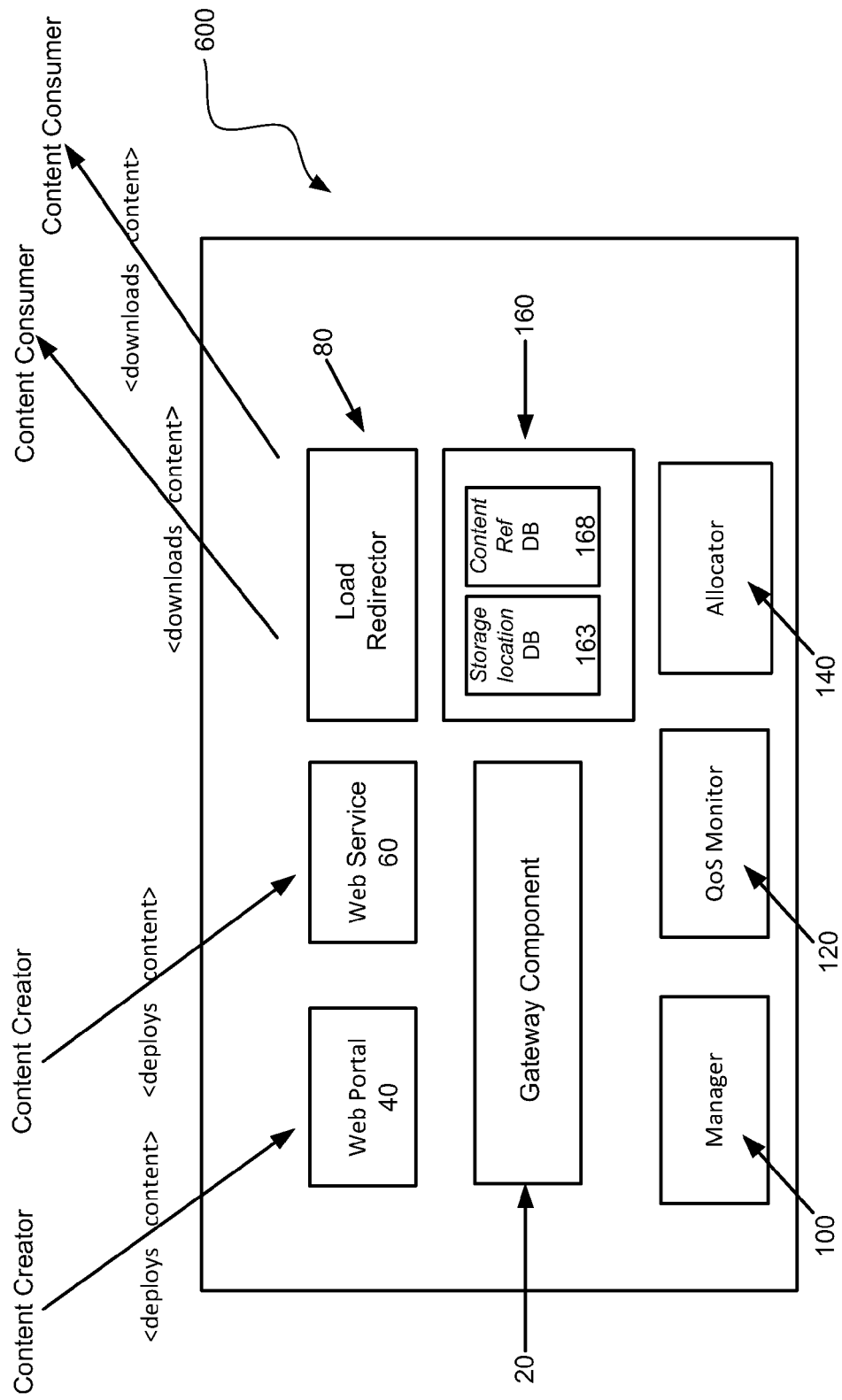
FIG. 1 is a block diagram showing the components of a control system for an overlay content distribution network in accordance with a preferred embodiment of the present invention.

In recent years a number of companies have started offering remote storage services. These services (which are often referred to as being part of a "storage cloud") enable users to upload digital content, including multimedia content, to a remote storage facility. The storage is "remote" in that the location at which the digital content is physically stored may be remote from the geographic location of the user, and the content can be accessed using any client device which can communicate with the remote storage facility. Such remote storage services or facilities are useful for a variety of purposes, including the storage of off-site backups, collaborative project documents, and documents which users wish to have available from a variety of client devices and locations.

1 APPENDIX

There are L storage locations (i.e. regions), that each contain $L^N$ unique (non-overlapping) storage nodes. $\mathcal{N}_1$ is the set of all storage modes in a location l, where l=1, 2, . . . , L. $\mathcal{N}$ is the set of all storage locations. Thus, $\mathcal{N} = \mathcal{N}_1 \cup \mathcal{N}_2 \cup \mathcal{N}_3 \ldots \cup \mathcal{N}_L$ Each storage node $x_{l,n} \in \mathcal{N}_l$ has a cost to store a gigabyte (GB) of data per month, denoted as $c_{l,n}$ where l=1, 2, . . . , L and n=1, 2, . . . , $L^N$.

1.1 Cost Optimised Deployment

A user wants a file replicated of size S (in gigabytes) in L storage locations. They specify a per month budget of B. A feasible solution to this problem (where a minimum of one storage, node is utilised in each location L) would need to satisfy the following constraints.

$$\sum_{l=1}^{L} \sum_{n \in \mathcal{N}_l} x_{l,n} \cdot c_{l,n} \cdot S \leq B, \quad (1)$$

$$\sum_{n \in \mathcal{N}_l} x_{n,l} \geq 1, \forall \mathcal{N}_l \in \mathcal{N} \quad (2)$$

Constraint 1 ensures that the total cost does not exceed the budget B. Constraint 2 ensures that at least one storage node is utilised from each location.

The problem can be formulated using Integer programming, and in particular represents a simple form of the zero-one knapsack problem, where the decision variables (e.g. $x_{l,n}$, which denotes whether to use s particular storage node at not) are constrained to be binary.

1.1.1 Minimum Cost

First, we consider the allocation problem as a cost minimisation exercise, where we try to minimise the money spent on storing the file replicas, whilst still storing at least one copy of the file in each location requested within the budget available:

$$\text{minimize} \sum_{l=1}^{L} \sum_{n \in \mathcal{N}_l} x_{l,n} \cdot c_{l,n} \cdot S \text{ subject to } (1) - (2).$$

This may be infeasible if no solution can be found to meet the constraints. This approach is likely to yield a single storage node per location as it is focused on minimising cost.

1.1.2 Maximise Number of Replicas

Next, we attempt to maximise the number of replicas stored (and consequently the number of storage nodes employed), whilst still storing at least one copy of the file in each location requested within the budget available:

$$\text{maximize} \sum_{l=1}^{L} \sum_{n \in \mathcal{N}_l} x_{l,n} \text{ subject to } (1) - (2).$$

This may be infeasible if no solution can be found to meet the constraints. This approach will yield multiple storage nodes per location if there is room in the budget after the basic constraints are met.

1.1.3 Maximise Number of Replicas with Even Spread

The optimisation resulting from simply maximising the number of replicas may result in an unbalanced utilisation of storage node locations. That is, there may be many storage nodes utilised in a single location (i.e. due to low cost) and only one storage node used in another location. As such, we now attempt to maximise the number of replicas stored in each location, whilst still storing at least on copy of the file in each location requested within the budget available. To achieve this we attempt to maximise the minimum number of storage nodes utilised in each region:

$$\text{maximize} \left( \min \sum_{n \in \mathcal{N}_l} x_{l,n}, \forall \mathcal{N}_l \right); \text{ subject to } (1) - (2).$$

This approach will yield a more balanced number of storage nodes used from each location. An alternative approach could be to progressively Increase the minimum number of nodes needed in each location (i.e. adjust Constrain 2) until just before the point the budget (Constraint 1) can no longer be met.

These storage cloud resources may be used to create an overlay content distribution network one example of which is "MetaCDN", which is described in "MetaCDN: Harnessing 'Storage Clouds' for high-performance content delivery", *Journal of Network and Computer Applications* 32 (2009) 1012-1022, the entire disclosure of which is incorporated herein by reference.

As illustrated in FIG. 1, MetaCDN includes a control system 600, including a gateway component 20 communicatively coupled to a web portal 40 and a web service 60, a load redirector 80, a manager component 100, a Quality of Service (QoS) monitor 120, an allocator component 140, and a database 160.

In a preferred embodiment of the present invention, improvements are made to the gateway component 20 and the allocator component 140 to create a high performance and flexible overlay content distribution network controlled by the overlay content distribution network control system 600.

The web portal 40 and web service 60 provide graphical and programmatic interfaces respectively for users to interact with to store digital content using the overlay content distribution network.

The load redirector 80 is responsible for directing requestors of digital content to the most appropriate copy of that digital content.

A user wishing to store digital content using the overlay content distribution network may use either the web portal 40 or the web service 60 to make a request to store the digital content. This results in storage request data representing the request to store the digital content being transmitted to gateway component 20. The storage request data may be received by the web service 60 from a computing device operated by the user, the web service 60 merely retransmitting storage request data to the gateway component 20.

The storage request data may include one or more JavaScript Object Notation (JSON) messages. These messages may include data identifying:
 i) the source location of the digital content (for example, a Uniform Resource Locator or URL, or a location on the client device operated by the user);
 ii) the name of the file storing the digital content;
 iii) the size of the digital content;
 iv) the date and time until which the digital content is to be stored;
 v) the geographical regions from which it is anticipated that the content will be requested; and
 vi) descriptive labels or tags which may be used to describe the digital content.
 Some or all of this data may be stored in database 160.

The storage request data may also include JSON messages having strategy data representing a digital content deployment strategy. Deployment strategies include:
 i) deployment for maximum coverage and performance;
 ii) location-specific deployment;
 iii) quality-of-service deployment; and
 iv) cost-optimised deployment.

Where the strategy data represents quality-of-service deployment, the storage request data preferably also includes desired performance data representing desired content serving performance characteristics. The JSON messages sent to the gateway component 20 may include data representing:
 i) the desired average throughput, that is, the average speed at which it is desired that the content be served (measured, for example, in kilobytes per second);
 ii) the desired average response time, that is, the average delay after which content is requested that the content transmission commences (measured, for example, in milliseconds); and
 iii) the desired uptime of the storage location, that is, a measure of the extent to which the content is consistently available to be requested and subsequently transmitted.

Where the strategy data represents cost-optimised deployment, the storage request data preferably includes desired budget data representing at least one constraint on the cost of storing and serving the digital content. The JSON messages sent to the gateway component 20 may include data representing:
 i) a per-month storage budget, being the highest amount of the user is prepared to pay each month for storage of the digital content;
 ii) a per-month transfer budget, being the highest amount the user is prepared to pay each month for transferring content to one or more remote storage locations; and
 iii) a per-month delivery budget, being the highest amount the user is prepared to pay each month for delivering content to users who request the content.

Figure 2:
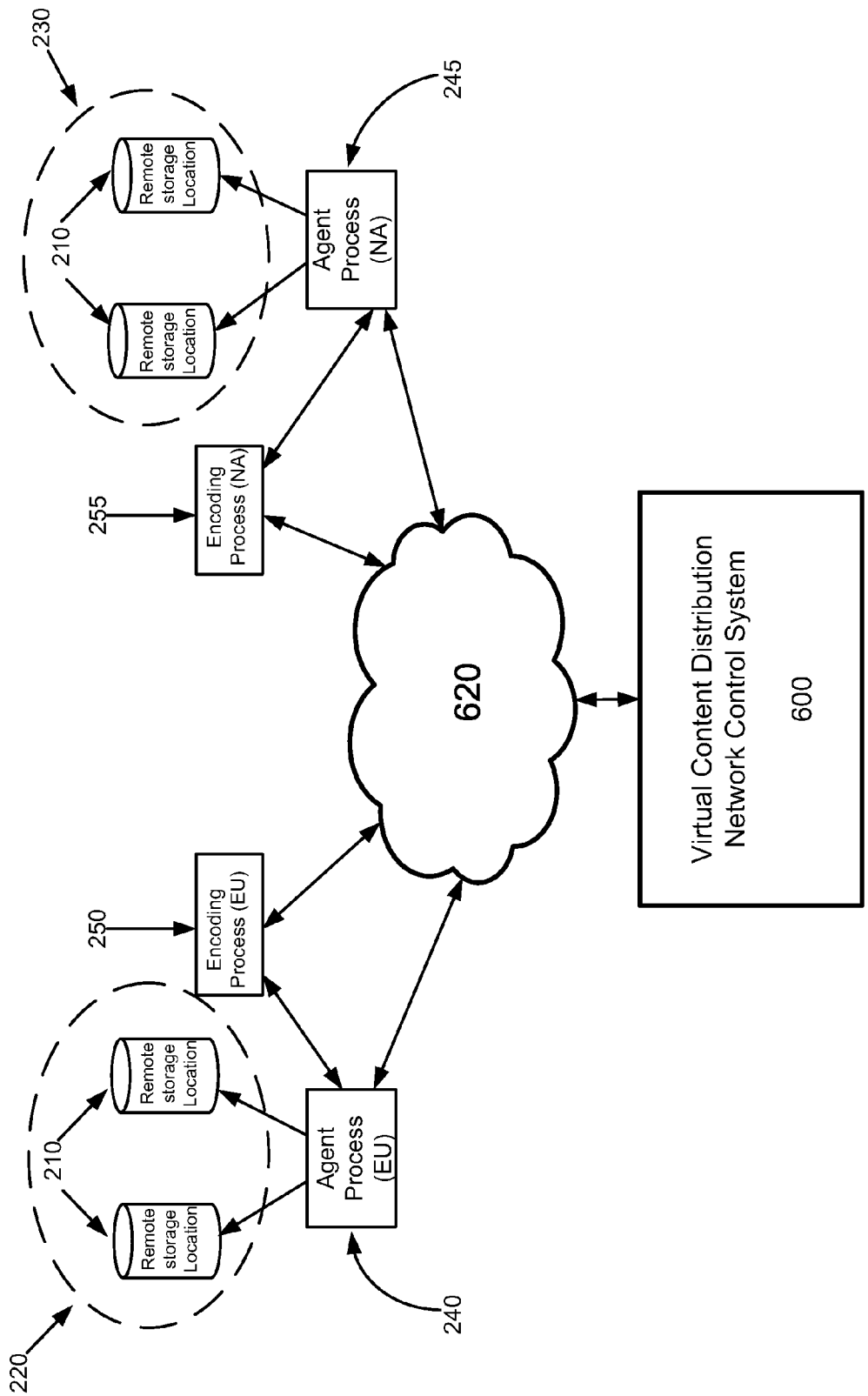
FIG. 2 is a schematic diagram of the architecture of the content distribution network.

The allocator component 140 is responsible for determining, from a plurality of remote storage locations 210, the least one remote storage location 210 at which the digital content is to be stored (see FIG. 2). The plurality of remote storage locations 210 are maintained by unrelated storage providers. Examples of such storage locations include Amazon Simple Storage Service (S3) and Nirvanix Storage Delivery Network (SDN). Each remote storage location 210 is accessible using messages having a format specific to each respective storage location 210. For example, the messages used to access storage services provided by Amazon S3 have a different format to the messages used to access Nirvanix SDN.

Each of the remote storage location 210 are accessible independently of each other, and independently of the allocator component 140. That is, each of the storage locations may be used simply to store data on request from a user, outside the context of an overlay content distribution network. Using the examples above, the Amazon S3 service is directly accessible completely independently of the Nirvanix SDN, and both the Amazon S3 service and the Nirvanix SDN can be accessed in a conventional manner, without the use of allocator component 140.

Each remote storage location 210 may protect stored content using a security policy. The security policies implemented by each remote storage location 210 may be specific to that remote storage location 210. For example, the security policy implemented by Amazon S3 may be different to the security policy implemented by Nirvanix SDN.

A security policy may be implemented by a remote storage location 210 to prevent unauthorised access to digital content stored at that remote storage location 210. The security policy may involve the use of access control lists (ACL), passwords and public/private keys. The security policy may also restrict access to stored digital content based on the geographical or network address of the content requesting device. Any other known security policies or mechanisms may be implemented by remote storage locations 210. The allocator component 140 may be configured to interact with each of the security policies for each remote storage location 210.

Database 160 preferably includes a storage location database 163 and a content reference database 168. The storage location database 163 stores details of the plurality of remote storage locations 210. The content reference database 168 stores content location data identifying the location of content stored using the overlay content distribution network.

To determine at least one remote storage location at which to store the digital content referred to in the storage request data, the allocator component 140 queries the storage location database 163 to determine appropriate storage locations at which to store the digital content. The determination of which storage locations 210 are appropriate may be based, at least in part, on any digital content deployment strategy embodied in the strategy data.

Where the strategy data represents deployment for maximum coverage and performance, the allocator component 140 queries the storage location database 163 to retrieve details of all of the storage locations 210 having records in the database 163. Where the strategy data represents location-specific deployment, the allocator component 140 queries the storage location database 163 to determine at least one remote storage location 210 geographically located in or near the at least one region specified in the storage request data.

Quality-of-Service Deployment

Where the strategy data represents quality-of-service deployment and the storage request data also includes desired performance data representing desired content serving performance characteristics (as described above), the allocator component 140 queries the storage location database 163 to identify at least one remote storage location 210 capable of serving the digital content in a manner which meets or exceeds the desired content serving performance characteristics. For example, if the storage request data includes data representing a desired average throughput, only those remote storage locations 210 that can serve data, on average, at a speed greater than the desired average throughput will be determined by the allocator component 140 from the storage location database 163.

It follows that the storage location database 163 stores content serving performance characteristics in association with other details of remote storage locations 210. Data representing the content serving performance characteristics is periodically received by the storage location database 163 from quality-of-service (QoS) probes distributed within the network. The QoS probes periodically test each of the plurality of remote storage locations 210 by requesting content from the storage locations 210. These tests enable the QoS probes to generate data representing the content serving performance characteristics of each of the plurality of remote storage locations 210. The QoS monitor 120 also probes the plurality of storage locations 210.

The QoS probes and the QoS monitor 120 preferably track the historical response time, throughput, hops and HTTP response codes associated with each remote storage location 210. Dummy files are placed in each remote storage location 210. The QoS probes request these files a statistically significant number of times (for example more than 30 times) to record the content serving performance characteristics.

Data representing the content serving performance characteristics measured by the QoS probes and the QoS monitor 120 is sent to the storage location database 163 and is made available for use by the allocator component 140 when determining the at least one remote storage location 210 at which to store content.

The allocator component 140 then arranges for the digital content to be stored at the at least one remote storage location 210 which has performance characteristics which meet or exceed the desired content serving performance characteristics, in a process further described below.

The manager component 100 periodically receives the actual performance data representing content serving performance characteristics measured by the QoS probes and the QoS monitor 120 from either the storage location database 163, or directly from the QoS probes and QoS monitor 120. If the actual performance data relating to a remote storage location 210 represents measured content serving performance characteristics that do not meet or exceed (optionally, within some bound of error/confidence interval) the desired content serving performance characteristics associated with content stored at that remote storage location 210, the content is deactivated or deleted from the storage location 210. Similarly, if the actual performance data relating to a remote storage location 210 represents measured content serving performance characteristics that meet or exceed the desired content serving performance characteristics associated with content that is not stored at that storage location 210 (but has previously been stored by the overlay content distribution network), that content is copied to the remote storage location 210.

As the content serving performance characteristics of a storage location 210 may change over time, this monitoring by the manager component 100 ensures that digital content is stored in storage locations 210 that meet or exceed the desired content serving performance characteristics. Where content is stored at a remote storage location 210 on the basis that it meets or exceeds the desired throughput, if the measured throughput of that remote storage location drops below the desired throughput, the content is deleted from the remote storage location 210. Conversely where content is not stored at a remote storage location 210 on the basis that it does not meet or exceed the desired throughput, if the measured throughput of that remote storage location 210 rises above the desired throughput, the content is added to that remote storage location 210.

Manager component 100 is also responsible for tracking the usage of digital content that is stored using the overlay content distribution network. Statistics tracked by the manager component 100 include the number of times a file containing digital content is downloaded, and the most recent time the file was accessed. Additional per-download information may be tracked, such as the Internet Protocol address and geographic location (latitude/longitude) of the content requesting device, as well as characteristics of the device, such as the software and connection used to perform the download. This usage information is used by the manager component 100 to periodically optimise the management of content stored using the overlay content distribution network. The number of copies of a digital content file stored in remote storage locations 210 is increased in locations and at times where the number of requests for that file are high. Similarly, where there are no, or very few, requests for the file emanating from a specific geographic region, copies of the digital content stored in remote storage locations 210 in that specific region are removed.

Cost-Optimised Deployment

Where the strategy data represents cost-optimised deployment and the storage request data also includes desired budget data representing at least one constraint on the cost of storing and serving the digital content, the allocator component 140 queries the storage location database 163 to identify at least one remote storage location 210 capable of storing and serving the digital content at a cost within the constraint. For example, if the storage request data includes desired budget data representing a desired per-month storage budget, only those remote storage locations 210 that can store the data at a cost per month less than the desired per month storage budget will be determined by the allocator component 140 from the storage location database 163. It follows that the storage location database 163 stores cost data representing the basis upon which the cost of storing and serving the digital content at each of the remote storage locations 210 may be calculated.

The example described above is a simplistic one that uses a single constraint to illustrate cost-optimised and deployment of content on the overlay content distribution network.

However, it is anticipated that more than one constraint will be used to determine the remote storage locations 210 at which the digital content is to be stored. In such circumstances, the allocator component 140 is configured to determine the selected storage locations 210 at which to store the digital content using an integer program, an example of which is described in appendix 1.

The allocator component 140 then arranges for the digital content to be stored at the at least one remote storage location 210 which can store and serve the content within the cost constraints, in a process further described below.

In some circumstances, the storage costs associated with the remote storage locations 210 may change. Although the storage pricing of storage providers may change over time in response to competition or other market conditions, storage providers may also provide bulk discounts, tiered pricing and/or block pricing. For example, it may cost less per-gigabyte of data to store 10-19 GB of data than 1-9 GB of data, due to content storage volume discounts. Accordingly, a remote storage location 210 that only stored 8 GB of data may be too expensive to satisfy the constraint represented the desired budget data. However, if storage at that remote storage location 210 is increased to reach the next tier (eg by the storage of an additional 3 GB), the remote storage location 210 may become inexpensive enough to satisfy the constraint.

The allocator component 140 periodically re-evaluates the applicable cost for each storage location 210 or underlying remote storage provider (such as Amazon S3). It determines whether storage costs may be reduced for any content stored using the overlay content distribution network, and whether moving that content from one remote storage location 210 to another would reduce costs while still following the deployment strategy under which the content was first stored.

Regardless of whether the strategy data represents cost-optimised deployment or quality-of-service deployment, the allocator component 140 may take into account the security policy of a remote storage location 210 when determining whether or not to store the digital content at that remote storage location 210. The strategy data may optionally include data representing the desired baseline security, and the allocator component 140 may only store the digital content at remote storage locations 210 having security policies which meet or exceed the desired baseline security.

Storing Content

As described above, at least one remote storage location 210 at which the digital content is to be stored is determined by the allocator component 140. After the at least one remote storage location 210 is determined, the allocator component 140 sends, to at least one agent process 240, 245 associated with the at least one remote storage location 210, transfer request data representing a request to retrieve the digital content from the source location, and store it in the at least one storage location 210.

As illustrated in FIG. 2, preferably remote storage locations 210 are grouped by their geographical location. For example, storage locations 210 geographically based in Europe may belong to a single European group 220 and storage locations 210 geographically based in North America may belong to a single North American group 230. Each storage location group may be associated with at least one agent process 240, 245. These agent processes are part of the overlay content distribution network, managed by the allocator component 140, and are not inherently part of the remote storage locations 210. That is, the remote storage locations 210 may be accessible independently of each other and without the use of agent processes 240, 245. The remote storage locations 210, for example, could be accessible through the Amazon S3 and Nirvanix SDN offerings.

Where the overlay content distribution network uses multiple underlying storage providers (eg Amazon S3 and Nirvanix SDN) each of the underlying providers may be associated with an agent process 240, 245. In this way each storage location group may be associated with multiple agent processes 240, 245, with some of those agent processes 240, 245 associated exclusively with specific underlying storage providers.

If the allocator component 140 determines that the digital content should be stored in at least one remote storage location 210 belonging to the European group 220, the allocator component 140 sends, to the agent process 240 associated with the European group 220, transfer request data representing a request to retrieve the digital content from the source location identified in the storage request data, and store it in the least one storage location 210. The transfer request data includes data identifying the source location of the digital content and the at least one remote storage location 210 at which the data is to be stored.

The communication between the allocator component 140 and the agent process 240 is asynchronous. Accordingly, the allocator component 140 can send the transfer request data to the agent process 240, and continue to undertake other tasks without pausing and waiting for a response from the agent process 240. The agent process 240 is stateless, and is responsible for the simple task of transferring the digital content from the source location to the at least one storage location 210.

When the agent process 240 has completed its task, it sends to the allocator component 140 a status message containing data representing whether or not the digital content was successfully stored in the at least one remote storage location 210, and, if the digital was successfully stored, stored content location data representing a reference to the stored digital content. The data representing whether or not the digital content was successfully stored may simply be a flag within the message. The stored content location data may be in the form of a Uniform Resource Locator (URL). The stored content location data identifies the specific location within the remote storage location 210 where the digital content has been stored, and can optionally also identify the geographic location (for example in the latitude and longitude) of the stored content.

The status message is received by the allocator component 140, and the stored content location data is stored in content reference database 168 which is communicatively connected to the allocator component 140. Subsequent requests made of the overlay content distribution network for the stored digital content are received by the load redirector 80, which queries the content reference database 168 to provide to the content requester stored content location data. The content location data enables the content requester to obtain the digital content directly from the remote storage location 210. If geographical location data identifying the geographical location of the stored digital content is also part of the stored content location data, the load redirector 80 is able to provide the content requester with the URL of the geographically closest copy of the digital content.

The time taken for the allocator component 140 to generate and send transfer request data to agent process 240 will generally be less than the time necessary for agent process 240 to retrieve the digital content from the source location and store it in the at least one remote storage location 210. Where multiple requests to store content in the same geographic region are made within a short time period, a queue is maintained by the allocator component 140. If this queue gets too long (that is, if the size of the digital content requested to be retrieved and stored by existing agent processes 240 exceeds the size of the digital content successfully stored by the existing agent processes 240 by an amount greater than the capacity threshold) the allocator component 140 creates one or more additional agent processes 240 to which it can send outstanding transfer request data. In one embodiment, the allocator component 140 creates one or more additional agent processes 240 if all of the existing agent processes 240 are busy (that is, they are retrieving digital content from a source location and storing it in at least one remote storage location 210).

Figure 3:
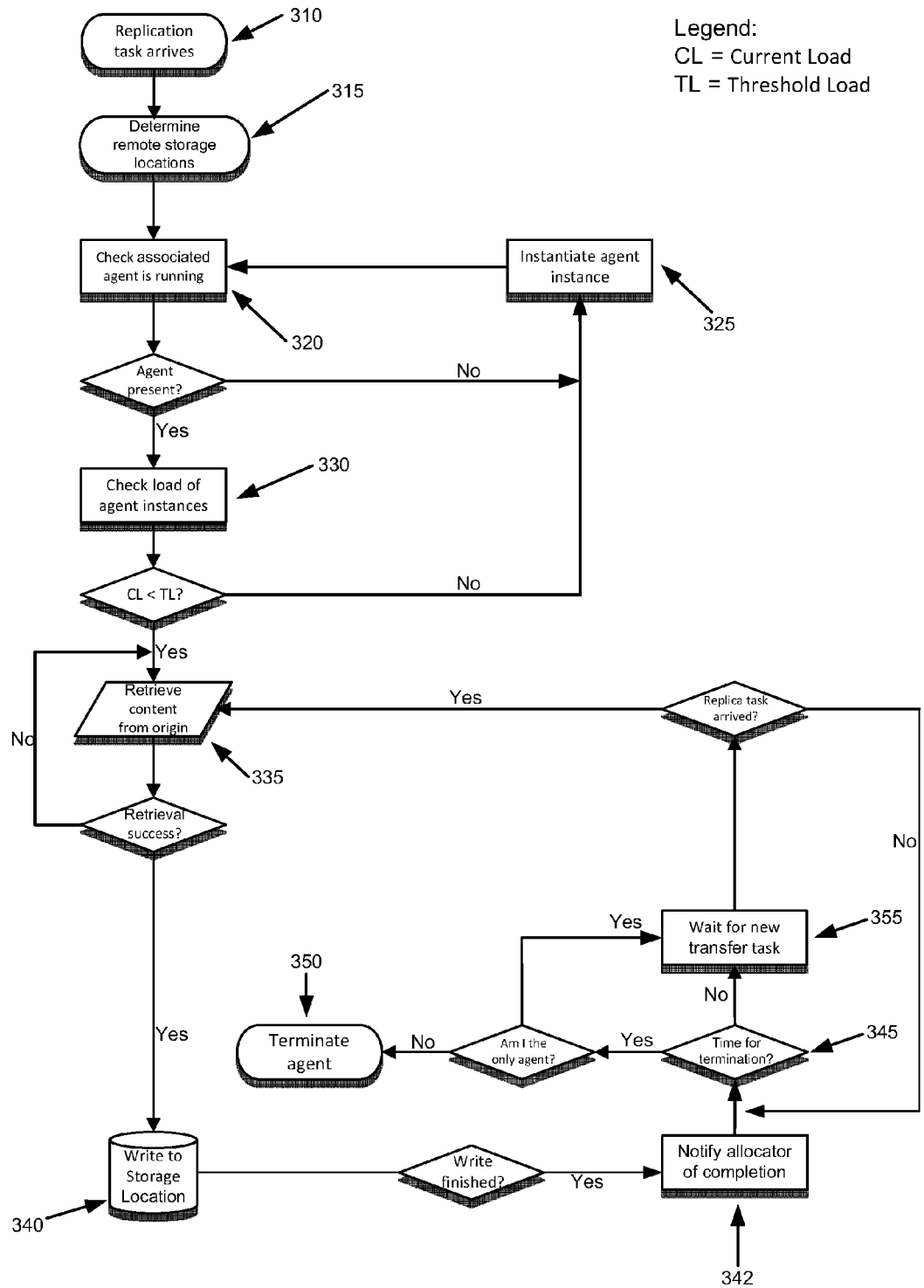
FIG. 3 is a flow diagram of a digital content storage process performed by the overlay content distribution network.

The process for storing digital content in one or more remote storage locations 210 is illustrated in FIG. 3. At step 310, the allocator component 140 receives from the gateway component 20 storage request data representing a request to store the digital content. As indicated above, this storage request data may include strategy data and an indication of the desired geographical areas in which the content is to be stored. The allocator component 140 determines from a plurality of remote storage locations (data records for which are stored in storage location database 163) the at least one remote storage location 210 at which the digital content is to be stored (step 315). The allocator component 140 then checks to see that there is a running agent process 240 associated with the at least one remote storage location 210 (step 320). As described above, this may involve checking whether there is a at least one running agent process 240 associated with each of the one or more geographical locations at which the content is to be stored. If no agent process 240 is running, an agent process 240 is created or instantiated (step 325). The allocator component 140 then checks to see that the agent process 240 has been successfully instantiated and is running (step 320).

The allocator component 140 then checks the load of the currently running agent processes 240 (step 330). If the current load of the agent processes 240 is greater than a threshold load (that is, the size of the digital content requested to be retrieved and stored by existing agent processes exceeds the size of the digital content successfully stored by the existing agent processes by an amount greater than a capacity threshold), an agent process 240 is instantiated (step 325). Otherwise, if the current load of the agent processes 240 is not greater than a threshold load, the allocator process 140 sends to a running agent process 240 transfer request data representing a request to retrieve the digital content from the source location, and store it in the at least one storage location determined by the allocator component 140. The agent process 240 retrieves ("pulls" or downloads) the content from the source location (step 335) until the retrieval is complete, after which the digital content is stored in the at least one storage location (step 340).

The allocator component 140 periodically terminates any idle agent processes 240. After the digital content is stored in the at least one storage location 210 at step 340, a status message is sent by the agent process 240 to the allocator component 140 indicating that the digital content was successfully stored (the status message including stored content location data representing a reference to the stored digital content) (step 342). The allocator component 140 checks whether it is time to terminate any idle agent processes 240 (step 345). If it is time to terminate any idle agent processes 240, the allocator component 140 checks to see whether the agent process 240 from which had just received the status message is the only running agent process 240 associated with the remote storage location 210 where the digital content is stored. If it is not the only agent process 240 associated with a remote storage location 210 the agent process is terminated (step 350). Otherwise, the agent process 240 remains active and waits for a new transfer task (step 355).

This use of agent processes 240 to undertake the work of transferring digital content from the source location to the at least one storage location 210 enables the overlay content distribution network infrastructure to scale depending on load. An increasing volume of storage requests may be serviced by increasing the numbers of agent processes 240, which are instantiated and terminated dynamically by the allocator component 140.

Storing Multimedia Digital Content

As described above, the overlay content distribution network may be used to store the digital content at one or more remote storage locations maintained by storage providers such as Amazon and Nirvanix. This enables digital content to be stored at locations geographically close to where it may be accessed or downloaded. This improves network efficiency and reduces content access times.

One potential use of the overlay content distribution network is to store multimedia digital content and progressively serve (or "stream") that content to requesting client devices. In this specification, the term "multimedia" is used to denote audio-only content, video-only content, and combined audio and video content. When streaming multimedia content to client devices, it is useful to be able to stream the content in formats compatible with the client devices. For example, multimedia content may be accessed by portable devices with limited processing and multimedia rendering capabilities, such as mobile telephones and computing tablets. Such devices can only view multimedia content compressed using specific compression algorithms and contained in specific container formats.

To enable digital multimedia content stored using the overlay content distribution network to be streamed to a wide variety of client devices, it is useful to be able to store the multimedia content in a number of formats. Examples of multimedia formats are set out in the table below.

| Container | Video Codec | Audio Codec | Target | Low Quality | Medium Quality | High Quality |
|---|---|---|---|---|---|---|
| MPEG-4 (.mp4) | H.264 | AAC | Chrome 4.0 +/ Safari 4.0 +/ Internet Explorer 9.0+ (PC) | Video: 256k Audio: 64k Resolution: 640 × 360 | Video: 512k Audio: 128k Resolution: 854 × 480 | Video: 1024k Audio: 160k Resolution: 1280 × 720 |
| Flash (.flv) | Sorenson Spark | MP3 | Internet Explorer =<8.0, Firefox =<3.6 | Video: 256k Audio: 64k | Video: 512k Audio: 128k | Video: 1024k Audio: 160k |

-continued

| Container | Video Codec | Audio Codec | Target | Low Quality | Medium Quality | High Quality |
|---|---|---|---|---|---|---|
| | (H.263 Variant) | | (PC) | Resolution: 640 × 360 | Resolution: 854 × 480 | Resolution: 1280 × 720 |
| WebM (.webm) | VP8 | Vorbis | Chrome 5.1 +/ Firefox 4.0 +/ Opera 10.54 + | Video: 256k Audio: 64k | Video: 512k Audio: 128k | Video: 1024k Audio: 160k |
| | | | (PC) | Resolution: 640 × 360 | Resolution: 854 × 480 | Resolution: 1280 × 720 |
| MPEG Transport Stream (.ts) | H.264 | AAC | Safari Mobile (iPad/iPhone) | Video: 64k Audio: 32k | Video: 192k Audio: 64k | Video: 672k Audio: 128k |
| | | | | Resolution: 400 × 224 | Resolution: 480 × 320 | Resolution: 640 × 480 |
| 3GP/3GP2 (.3gp/.3g2) | H.263 | AMR-NB/ AAC | Smartphones/ Featurephones, Nintendo DSi | Video: 64k Audio: 12.2k | Video: 192k Audio: 48k | Video: 350k Audio: 128k |
| | | | | Resolution: 128 × 96 | Resolution: 176 × 144 | Resolution: 352 × 288 |

Multimedia content is converted from one format to another through a process of encoding, to generate target multimedia digital content. (This process is also called transcoding.) One way in which the overlay content distribution network may be used to store a single piece of multimedia content in multiple formats is by separately uploading to the overlay content distribution network (by interacting with either the web service 60 or the web portal 40) each of the individual target multimedia digital content files. However, network utilisation (and therefore bandwidth costs) can be reduced by uploading only a single copy of the original multimedia digital content, and encoding that content into target multimedia digital content files (each being encoded into a different multimedia format) at a location geographically close to the at least one storage location at which the target multimedia digital content will be stored.

The gateway component 20 is configured to receive storage request data including data representing one or more desired characteristics of multimedia digital content. In addition to the data included in the storage request data described above, when it is desired to store multimedia digital content, the storage request data received by the gateway component 20 may also include data representing:
 i) the output format of the target multimedia digital content (for example MP4, FLV for video and combined video and audio, and MP3 for audio only);
 ii) the quality level at which the target multimedia digital content is to be encoded (for example, low, medium or high);
 iii) the type of content streaming to be made available to access the target multimedia digital content (for example real-time streaming or HTML streaming);
 iv) the media type (for example, audio or video); and
 v) the desired presentational method or wrapper used to deliver video (for example, Flash Player, HTML5 Video Player or Native Player).

The storage request data is sent to the allocator component 140, which determines the at least one storage location 210 at which to store the target multimedia digital content as described above. The allocator component 140 then selects at least one encoding process for execution on at least one remote processor, the at least one remote processor being selected based, at least in part, on its geographic location. Preferably, the at least one remote processor is selected based, at least in part, on its proximity to the at least one storage location 210 at which the target multimedia digital content will be stored.

The at least one encoding process is a type of agent, and, like agent processes 240, 245 (illustrated in FIG. 2) encoding processes can be instantiated and terminated dynamically by the allocator component 140.

As illustrated in FIG. 2, one or more encoding processes 250, 255 or the processors on which they are executed, may be associated with different geographic regions. The European geographic region may have a processor geographically proximate to it on which encoding process 250 may execute. Similarly, the North American geographic region may have a processor geographically proximate to it on which encoding process 255 may execute.

The allocator component 140 sends to the selected or created at least one remote encoding process 250, 255 encoding request data representing a request to retrieve the multimedia digital content from the source location and encode it to generate target multimedia digital content conforming to the one or more desired characteristics of multimedia digital content represented by the data in the storage request data. For example, the storage request data may include data indicating that one desired characteristic of multimedia digital content is that it is placed in an MPEG-4 container file format (with a .mp4 extension) using appropriate video and audio codecs. The encoding request data represents a request to retrieve the source multimedia digital content and encode it into a .mp4 file. The encoding process 250, 255 retrieves the multimedia digital content from the source location, encodes it into a file having the desired characteristics, and stores it in a local temporary storage location (which may be volatile or nonvolatile memory).

After the encoding has been completed, the encoding process 250, 255 sends to the allocator component 140 an encoding status message containing data representing whether or not the multimedia digital content was successfully encoded, and if the multimedia digital content was successfully encoded, target content location data representing a reference to the target multimedia digital content. The target content location data may be a URL to the location of the encoded multimedia digital content at the local temporary storage location.

Upon receipt of an encoding status message from a remote encoding process 250, 255 indicating successful encoding of the multimedia digital content, the allocator component 140 sends to at least one agent process 240, 245 transfer request data representing a request to retrieve the target multimedia digital content using the target content location data, and store it in the at least one storage location 210. As the agent process 240, 245 will be geographically proximate to the remote encoding process 250, 255, this transfer of target multimedia content from a storage location local to the encoding process 250, 255 to a remote storage location 210 will consume lower amounts of bandwidth than if the target multimedia content was transferred from the source location.

Alternatively, the remote encoding process 250, 255 may send an encoding status message or storage request data directly to an agent process 240, 245.

Figure 4:
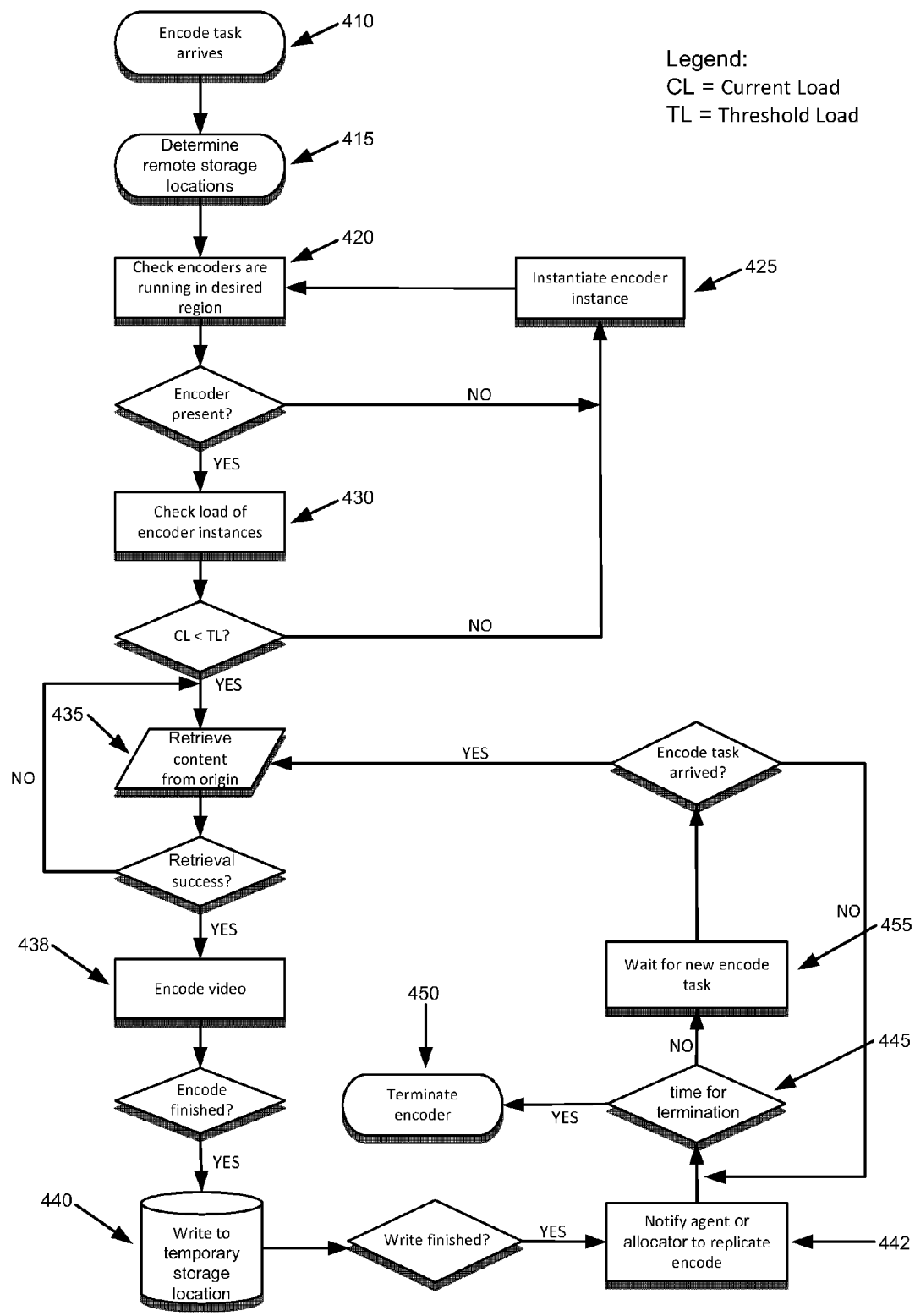
FIG. 4 is a flow diagram of a digital multimedia content encoding process performed by the overlay content distribution network.

The method executed by the overlay content distribution network to encode multimedia digital content close to where it will ultimately be stored is illustrated in FIG. 4. At step 410, the allocator component 140 receives from the gateway component 20 storage request data representing a request to store the digital content, including data representing one or more desired characteristics of multimedia content (as described above). The storage request data may also include strategy data and an indication of the desired geographical areas in which the content is to be stored. The allocator component 140 determines from a plurality of remote storage locations (data records for which are stored in storage location database 163) the at least one remote storage location 210 at which the digital content is to be stored (step 415). The allocator component 140 then checks to see that there is a running remote encoding process 250 associated with the at least one remote storage location (step 420). If no remote encoding process 250 is running, an encoding process 250 is created or instantiated (step 425). The allocator component 140 then checks to see that the encoding process 240 has been successfully instantiated and is running (step 320).

The allocator component 140 then checks the load of the currently running encoding processes 250 (step 430). If the current load of the encoding processes 250 is greater than a threshold load (that is, the size of the digital content requested to be encoded by existing encoding processes exceeds the size of the digital content successfully encoded by the existing encoding processes by an amount greater than an encoding capacity threshold), an additional encoding process 250 instantiated (step 425). Otherwise, if the current load of the encoding processes 250 is not greater than a threshold load, the allocator process 140 sends to a running encoding process 250 encoding request data representing a request to retrieve the multimedia digital content from the source location, and encode it to generate target multimedia digital content conforming to the one or more desired characteristics of multimedia digital content. The encoding process 250 retrieves ("pulls" or downloads) the multimedia digital content from the source location (step 435) until the retrieval is complete, encodes the multimedia digital content to generate target multimedia digital content conforming to the one or more desired characteristics of multimedia digital content (step 438), and stores it in local temporary storage after the encoding is complete (step 440).

After the target multimedia digital content is completely stored at the temporary storage location, the encoding process 250 sends an encoding status message to either directly an agent process 240 or to the allocator component 140 (step 442). The encoding status message includes target content location data representing a reference to the target multimedia digital content in the local temporary storage. Where the encoding status message is sent to the allocator component 140, it includes data representing whether or not the multimedia digital content was successfully encoded. Upon receipt of an encoding status message from a remote encoding process 250 indicating successful encoding of the multimedia digital content, the allocator component 140 sends, to at least one agent process 240, transfer request data representing a request to retrieve the target multimedia digital content using the target content location data, and store it in the at least one storage location 210. The at least one agent process 240 to which the transfer request data is sent is preferably associated with the remote storage location determined at step 415.

The allocator component 140 periodically terminates any idle encoding processes 250. After the digital content is stored in the at least one storage location 210 by the at least one agent process 240, a status message is sent by the agent process 240 to the allocator component 140 indicating that the digital content was successfully stored (and including stored content location data representing a reference to the stored digital content). The allocator component 140 checks whether it is time to terminate any idle encoding processes 250 (step 445). If it is time to terminate any idle encoding processes 250, the encoding process 250 is terminated. Otherwise, the encoding process 250 remains active and waits for a new transfer task (step 455).

This use of at least one encoding process 250 that is geographically near the remote storage location 210 where the target multimedia digital content (the encoded content) will be stored reduces the distance that the target multimedia digital content needs to traverse.

Like agent processes 240, encoding processes 250 may be created and terminated by the allocator component 240, enabling the overlay content distribution network to scale effectively to deal with large encoding loads. This creation and destruction of encoding processes 250 could be triggered by a single request from the manager component 100 or when a predetermined threshold has been exceeded.

Where the storage request data includes strategy data representing cost-optimised deployment and/or desired budget data, in addition to data representing one or more desired characteristics of multimedia digital content, the allocator component 140 can create one or more additional encoding processes 250 based on the desired budget data in addition to current encoding loads experienced by existing encoding processes 250. For example, where there is very little room in the budget for encoding, the allocator component 140 may use spot instances to run encoders, using leased computational capability purchased at a market-determined rate (which is generally cheaper than guaranteed on-tap computational capability). Conversely, if the content can be stored cheaply and there is still some room in the budget, additional encoding processes 250 could be created to complete the encoding task more quickly.

In this respect, the storage request data may include availability time data, the availability time data representing a time by which the multimedia digital content is required to be available for download or streaming. The availability time data preferably represents a time offset from the time the request to store the content is made. For example, the availability time data may be "10", which indicates that the multimedia digital content must be available for download or streaming within 10 hours of making the request to store the content.

The availability time data may determine whether additional encoding processes 250 are created. For example, if the availability time data is "1", additional encoding processes 250 may be required to be immediately created in order to encode the multimedia digital content within the next hour. The costs associated with the encoding of this content therefore increase, and these costs may be passed on to the customer of the overlay content distribution network. However, if the availability time data is "30", it may be sufficient to lease computational capability periodically at the cheapest possible time, create one or very few encoding processes 250 and still have the multimedia digital content encoded within the next 30 hours. The costs associated with encoding this data are correspondingly reduced.

Figure 5:
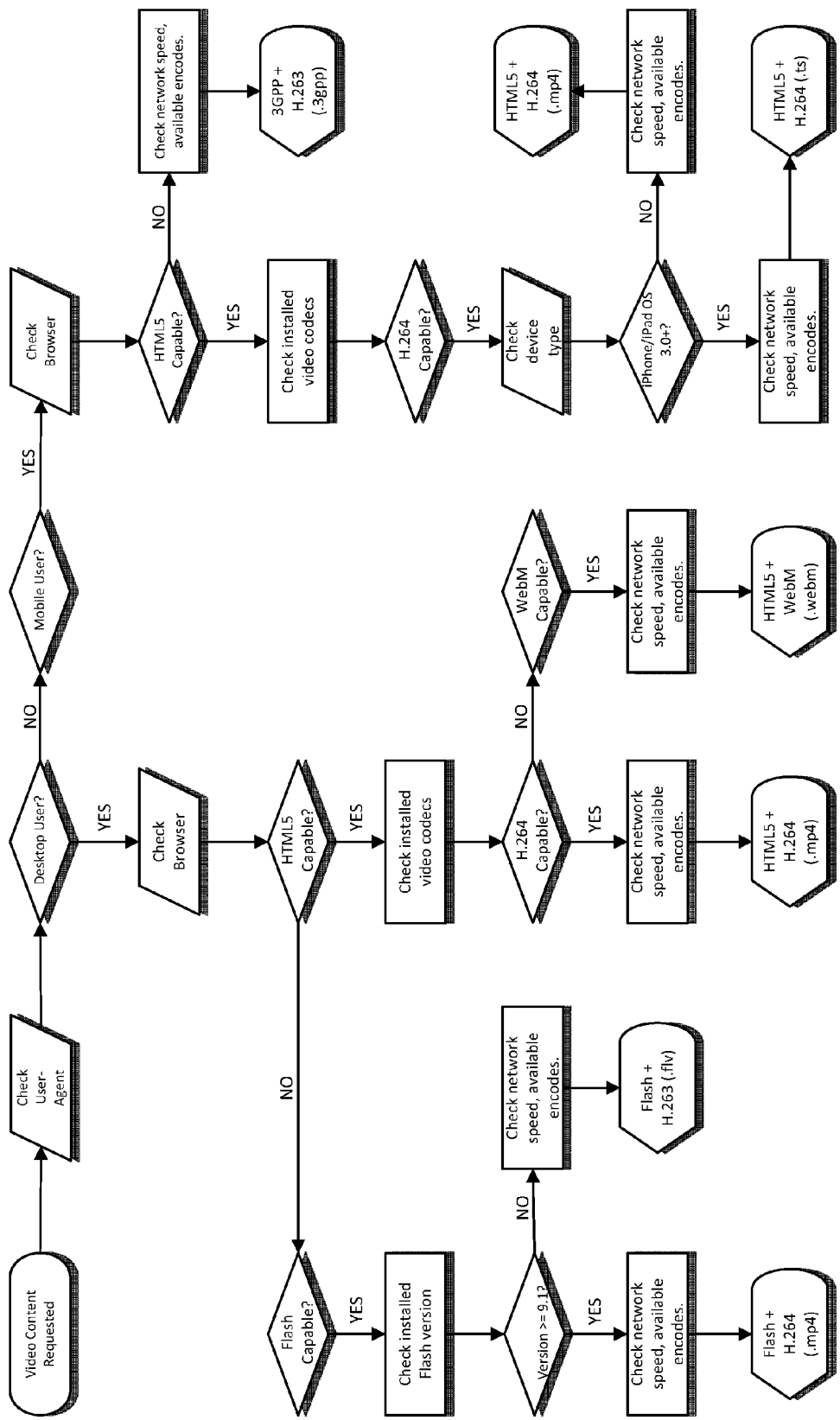
FIG. 5 is a flow diagram of a digital content serving process performed by the overlay content distribution network.

When a client device requests multimedia digital content stored in the overlay content distribution network, the characteristics of the client device and its connection to the overlay content distribution network are determined, and an appropriately formatted target multimedia digital content file is sent or streamed to the client device from an appropriate remote storage location 210. The process for determining the appropriate target multimedia digital content file to send or stream to the client device is illustrated in FIG. 5. Where an appropriately formatted target multimedia digital content file has not been stored in the overlay content distribution network, an encoding process 250 may be instantiated to encode the multimedia digital content into an appropriately formatted target multimedia digital content file for storage in the overlay content distribution network.

Figure 6:
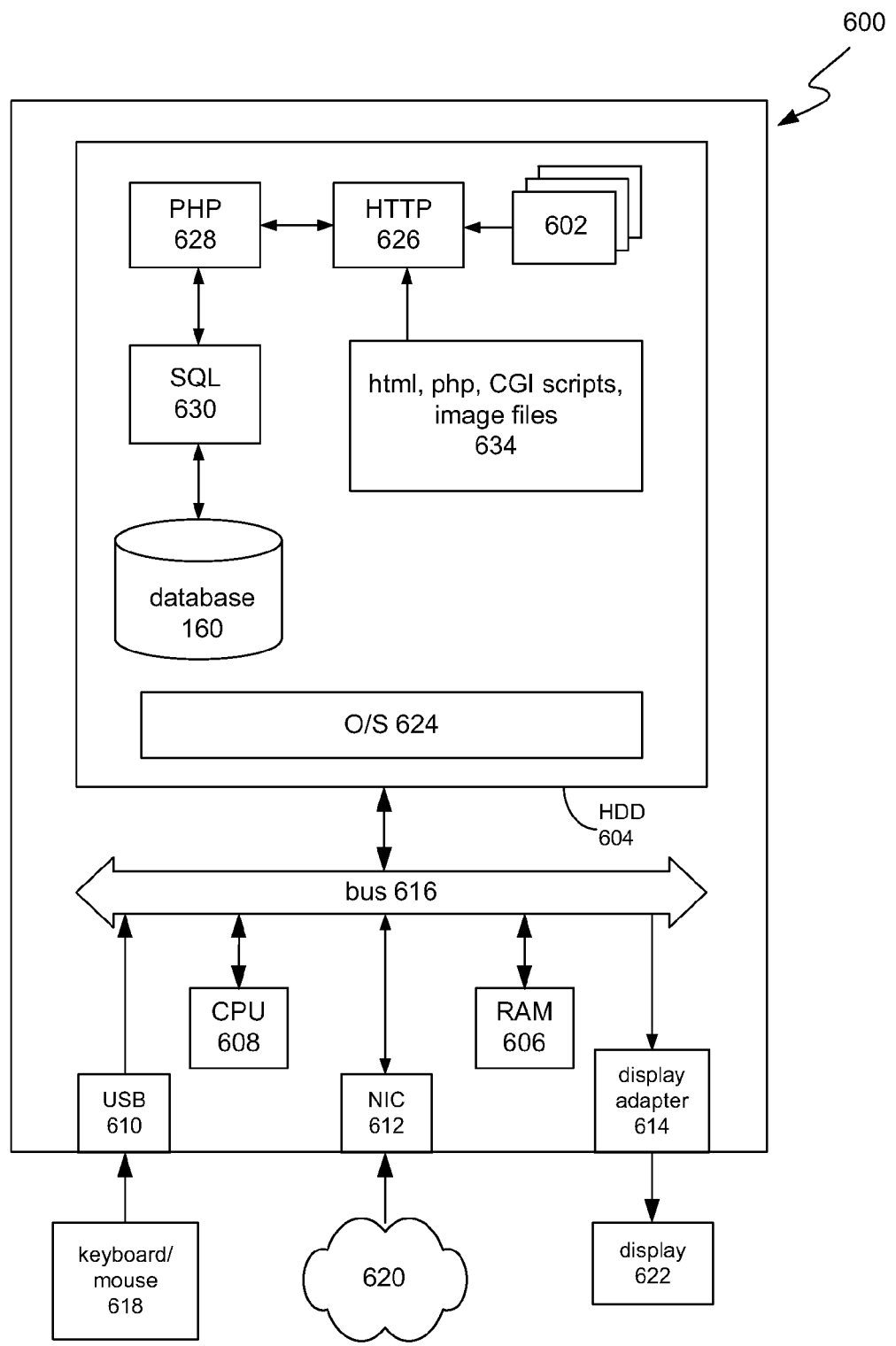
FIG. 6 is a block diagram of computer hardware for complementing the content distribution network control system.

The gateway component 20, web portal 40, web service 60, load redirector 80, manager component 100, QoS monitor 120, allocator component 140, and database 160 may be implemented in a standard computer system 600 such as a 32-bit or 64-bit Intel Architecture based computer system, as shown in FIG. 6, and the processes undertaken by the gateway component 20 and allocator component 140 described above implemented in the form of programming instructions of one or more software modules 602 stored on non-volatile (e.g., hard disk) storage 604 associated with the computer system 600. However, it will be apparent that at least parts of the processes described above could alternatively be implemented as one or more dedicated hardware components, such as application-specific integrated circuits (ASICs) and/or field programmable gate arrays (FPGAs).

The system 600 includes standard computer components, including random access memory (RAM) 606, at least one processor 608, and external interfaces 610, 612, 614, all interconnected by a bus 616. The external interfaces include universal serial bus (USB) interfaces 610, at least one of which may optionally be connected to a keyboard and a pointing device such as a mouse 618, a network interface connector (NIC) 612 which connects the system 600 to a communications network by which it communicates with agent processes 240 and encoding agents 250, such as the Internet 620, and a display adapter 614, which is optionally connected to a display device such as an LCD panel display 622.

The system 600 also includes a number of standard software modules 626 to 630, including an operating system 624 such as Linux or Microsoft Windows Server, web server software 626 such as Apache, available at http://www.apache.org, scripting language support 628 such as PHP, available at http://www.php.net, Microsoft ASP or Java Server Pages (JSP), and structured query language (SQL) support 630 such as MySQL, available from http://www.mysql.com, which allows data to be stored in and retrieved from database 160.

Together, the web server 626, scripting language 628, and SQL modules 630 implement the web portal 40, enabling users of the Internet 620 with standard computing devices equipped with standard web browser software to access the system 600.

However, it will be understood by those skilled in the art that some of the specific functionality provided by the system 600 to such users is provided by scripts accessible by the web server 626, including the one or more software modules 602 implementing the processes described above, and also any other scripts and supporting data 634, including markup language (e.g., HTML, XML) scripts, PHP (or ASP, JSP), and/or CGI scripts, image files, style sheets, and the like.

Many modifications will be apparent to those skilled in the art without departing from the scope of the present invention as herein described with reference to the accompanying drawings. For example, the agent processes 240 and encoding processes 260 may not be periodically assessed for termination, but continually assessed such that at the end of any transfer or encoding task, the responsible agent process 240 or encoding process 260 may be terminated immediately.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

I claim:

1. A computer-implemented system for storing digital content in a remote storage location, the system including:
   a gateway module configured to receive storage request data representing a request to store digital content, the storage request data including data identifying a source location of the digital content;
   an allocator module configured to:
      determine from a plurality of remote storage locations the remote storage location at which the digital content is to be stored, wherein the plurality of remote storage locations includes a first location accessible using a first message format and a second location accessible using a second different message format, wherein at least one agent process communicates with the remote storage location;
      receive at least one status message, from one or more of the at least one agent processes, containing data representing whether or not previous digital content has been successfully stored;
      dynamically create one or more additional agent processes that communicate with the remote storage location,
         wherein the one or more additional agent processes are overlay processes external to the storage location, and the one or more additional agent processes are configured to transfer the digital content,
         wherein the creation of the one or more additional agent processes is in response to:
            a determination, based on the at least one status message, that adding the digital content to a queue of the at least one agent process will cause the queue to exceed capacity threshold; and/or
            a determination that no agent processes that communicate with the remote storage location are available;
      send, to the one or more additional agent processes that communicate with the remote storage location, transfer request data representing a request to retrieve the digital content from the source location, and store it in the remote storage location, wherein the one or more additional agent processes return a content location after storing the digital content, and the stored content location is for directly accessing the storage location without utilizing the one or more additional agent processes.

2. A system as claimed in claim 1 wherein the first location and second location are accessible independently of each other and independently of the allocator module.

3. A system as claimed in claim 1 wherein the at least one status message further contains:
   data representing that the digital content was successfully stored; and
   stored content location data representing a reference to the stored digital content.

4. A system as claimed in claim 3 wherein the allocator module is further configured to store the stored content location data in a content reference database communicatively connected to the allocator module.

5. A system as claimed in claim 1 wherein the allocator module is further configured to create the one or more additional agent processes upon the determination, based on the at least one status message, that adding the digital content to the queue of the at least one agent process will cause the queue to exceed the capacity threshold.

6. A system as claimed in claim 1 wherein the allocator module is further configured to create the one or more additional agent processes upon the determination that all agent processes associated with the at least one remote storage location are retrieving content; storing content; or are otherwise unavailable.

7. A system as claimed in claim 1 wherein the allocator module is further configured to periodically terminate any idle agent processes.

8. A system as claimed in claim 1 wherein the storage request data includes strategy data representing a digital content deployment strategy.

9. A system as claimed in claim 8 wherein the strategy data represents one of:
   deployment for maximum coverage and performance;
   location-specific deployment;
   quality-of-service deployment; and
   cost-optimized deployment.

10. A system as claimed in claim 9, wherein where strategy data represents quality-of-service deployment and the storage request data also includes desired performance data representing desired content serving performance characteristics, the allocator module is further configured to query a storage location database storing details of the plurality of remote storage locations to identify at least one remote storage location capable of serving the digital content in a manner which meets or exceeds the desired content serving performance characteristics.

11. A system as claimed in claim 10, wherein the system further includes a manager module configured to:
   periodically receive actual performance data representing measured content serving performance characteristics relating to at least one of the plurality of remote storage locations;
   if the actual performance data represents measured content serving performance characteristics that do not meet or exceed the desired content serving performance characteristics, and a copy of the digital content is stored at the at least remote storage location, send, to the at least one agent process associated with the at least one storage location, transfer request data representing a request to deactivate or delete the digital content from the at least one remote storage location; and
   if the actual performance data represents measured content serving performance characteristics that meet or exceed the desired content serving performance characteristics, and a copy of the digital content is not stored at the at least remote storage location, send, to the at least one agent process associated with the at least one storage location, transfer request data representing a request to copy the digital content from a remote storage location from which it is available to the at least one storage location.

12. A system as claimed in claim 9, wherein where the strategy data represents cost-optimized deployment and the storage request data also includes desired budget data representing at least one constraint on the cost of storing and serving the digital content, the allocator module is further configured to:
   retrieve, from a storage location database storing details of the plurality of remote storage locations, cost data representing the basis upon which the cost of storing and served the digital content at each of the remote storage locations may be calculated;
   determine, from the storage request data and the cost data, selected storage locations at which the digital content may be stored and served at a cost within the constraint; and
   send, to at least one agent process associated with each of the selected storage locations, transfer request data representing a request to retrieve the digital content from the source location, and store it in the at least one storage location.

13. A system as claimed in claim 12, wherein the allocator module is configured to determine the selected storage locations using an integer program.

14. A system as claimed in claim 1 wherein:
   the storage request data further includes data representing one or more desired characteristics of multimedia digital content; and
   the allocator module is further configured to:
      select or create at least one remote encoding process for execution on at least one remote processor, the at least one remote processor being selected based, at least in part, on its geographic location; and
      send, to the at least one remote encoding process, encoding request data representing a request to retrieve the multimedia digital content from the source location and encode it to generate target multimedia digital content conforming to the one or more desired characteristics of multimedia digital content.

15. A system as claimed in claim 14, wherein the allocator module is further configured to receive at least one encoding status message from each one or more of the at least one remote encoding processes, the at least one encoding status message containing:
   data representing that the multimedia digital content was successfully encoded; and
   target content location data representing a reference to the target multimedia digital content; and
   wherein the transfer request data is sent by the allocator module upon receipt of the at least one encoding status message.

16. A system as claimed in claim 14 wherein the allocator module is further configured to select or create the at least one remote encoding process based, at least in part, on its actual or desired geographic location relative to the geographic location of the at least one storage location.

17. A method for storing content in a storage location, the method including:
   receiving storage request data representing a request to store digital content, the storage request data including data identifying a source location of the digital content;

determining from a plurality of remote storage locations the storage location at which the digital content is to be stored, wherein the plurality of remote storage locations includes a first location accessible using a first message format and a second location accessible using a second different message format, wherein at least one agent process connects to the storage location;

receiving at least one status message, from one or more of the at least one agent processes, containing data representing whether or not previous digital content has been successfully stored;

dynamically creating one or more additional agent processes that connect to the storage location,
   wherein the one or more additional agent processes are overlay processes external to the storage location, and the one or more additional agent processes are configured to transfer the digital content;
   wherein the creation of the one or more additional agent processes is in response to:
      a determination, based on the at least one status message, that adding the digital content to a queue of the at least one agent process will cause the queue to exceed capacity threshold; and/or
      a determination that no agent processes that communicates with the storage location are available; and sending, to the one or more additional agent processes that connect to the storage location, transfer request data representing a request to retrieve the digital content from the source location, and store it in the storage location, wherein the one or more additional agent processes return a content location after storing the digital content, and the stored content location is for directly accessing the storage location without utilizing the one or more additional agent processes.

18. A method as claimed in claim 17 wherein the first location and the second location are accessible independently of each other and without the use of the at least one agent process.

19. A method as claimed in claim 17, wherein the at least one status message further contains:
   data representing that the digital content was successfully stored; and
   stored content location data representing a reference to the stored digital content.

20. A method as claimed in claim 17, further including creating the one or more additional agent processes upon the determination, based on the at least one status message, that adding the digital content to the queue of the at least one agent process will cause the queue to exceed the capacity threshold.

21. A method as claimed in claim 20, further comprising periodically destroying any idle agent processes.

22. A method as claimed in claim 17, wherein:
   the storage request data further includes data representing one or more desired characteristics of multimedia digital content; and
   the method further includes:
      selecting or creating at least one remote encoding process for execution on at least one remote processor, the at least one remote processor being selected or created based, at least in part, on its geographic location; and
      sending, to the at least one remote encoding process, encoding request data representing a request to retrieve the multimedia digital content from a source location and encode it to generate target multimedia digital content conforming to the one or more desired characteristics of multimedia digital content.

23. A method as claimed in claim 22, further comprising:
receiving at least one encoding status message from one or more of the at least one remote encoding processes, the at least one encoding status message containing:
   data representing that the multimedia digital content was successfully encoded; and
   target content location data representing a reference to the target multimedia digital content;
wherein the transfer request data is sent upon receipt of the at least one encoding status message.

24. A non-transitory computer-readable storage medium storing instructions that, when executed by a computing system, cause the computing system to perform operations for storing content in a storage location, the operations comprising:
   receiving storage request data representing a request to store digital content, the storage request data including data identifying a source location of the digital content;
   determining from a plurality of remote storage locations the storage location at which the digital content is to be stored, wherein the plurality of remote storage locations includes a first location accessible using a first message format and a second location accessible using a second different message format, wherein at least one agent process connects to the storage location;
   receiving at least one status message, from one or more of the at least one agent processes, containing data representing whether or not previous digital content has been successfully stored;
   dynamically creating one or more additional agent processes that connect to the storage location,
      wherein the one or more additional agent processes are overlay processes external to the storage location, and the one or more additional agent processes are configured to transfer the digital content;
      wherein the creation of the one or more additional agent processes is in response to:
         a determination, based on the at least one status message, that adding the digital content to a queue of the at least one agent process will cause the queue to exceed capacity threshold; and/or
         a determination that no agent processes that communicates with the storage location are available; and
   sending, to the one or more additional agent processes that connect to the storage location, transfer request data representing a request to retrieve the digital content from the source location, and store it in the storage location, wherein the one or more additional agent processes return a content location after storing the digital content, and the stored content location is for directly accessing the storage location without utilizing the one or more additional agent processes.

* * * * *